(12) United States Patent
Matekunas et al.

(10) Patent No.: US 6,560,526 B1
(45) Date of Patent: May 6, 2003

(54) ONBOARD MISFIRE, PARTIAL-BURN DETECTION AND SPARK-RETARD CONTROL USING CYLINDER PRESSURE SENSING

(75) Inventors: Frederic A. Matekunas, Troy, MI (US); Mark C. Sellnau, Bloomfield Hills, MI (US)

(73) Assignees: General Motors Corporation, Detroit, MI (US); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/519,393

(22) Filed: Mar. 3, 2000

(51) Int. Cl.$^7$ .......................... F02D 35/02; G01M 15/00
(52) U.S. Cl. ........................ 701/104; 701/110; 701/102; 701/115; 123/435; 123/480
(58) Field of Search .................. 701/104, 102, 701/110, 114, 115; 123/435, 479, 480; 73/116, 117.3

(56) References Cited

U.S. PATENT DOCUMENTS

| 4,403,505 A | * | 9/1983 | Hattori et al. | ............. 73/117.3 |
| 4,404,946 A | * | 9/1983 | Hoard et al. | ................ 123/478 |
| 4,408,582 A | * | 10/1983 | Merrick | ....................... 123/482 |
| 4,449,501 A | * | 5/1984 | Greeves | ....................... 123/435 |
| 4,621,603 A |   | 11/1986 | Matekunas | ................... 123/425 |
| 4,622,939 A |   | 11/1986 | Matekunas | ................... 123/425 |
| 4,624,229 A |   | 11/1986 | Matekunas | ................... 123/425 |
| 4,947,820 A | * | 8/1990 | Kushi | .......................... 123/478 |
| 4,969,352 A |   | 11/1990 | Sellnau | ........................ 73/115 |
| 5,765,532 A |   | 6/1998 | Loye | ........................... 123/435 |
| 5,878,717 A |   | 3/1999 | Zur Loye | .................... 123/435 |

FOREIGN PATENT DOCUMENTS

| EP | 0 026 642 A2 | * | 4/1981 | ............. F02D/5/00 |
| EP | 1 134 386 A2 | * | 9/2001 | ............ F02D/35/02 |

* cited by examiner

*Primary Examiner*—Hieu T. Vo
(74) *Attorney, Agent, or Firm*—Kathryn A. Marra

(57) ABSTRACT

A method is disclosed for detecting misfire or partial burn and for controlling spark retard in the cylinders of an internal combustion engine operated under the control of a microprocessor and utilizing signals indicative of the pressure in said cylinder at crank angle positions before and after initiation of combustion. A ratio of the actual pressure to the motored pressure in the cylinder at one or more predetermined crank angles is used to estimate the fraction of fuel burned which, in turn, enables a determination of combustion failure in said cylinder cycle. Confirmation of said misfire or unacceptable partial burn leads to correction of engine operation by said controller and/or to a diagnosis of possible damage to the vehicle's catalytic converter. This method also permits better engine operation under conditions of high spark retard.

19 Claims, 3 Drawing Sheets

ONBOARD MISFIRE, PARTIAL-BURN DETECTION AND SPARK-RETARD CONTROL USING CYLINDER PRESSURE SENSING

TECHNICAL FIELD

This invention relates to cylinder-pressure based engine control using the methodology referred to as pressure-ratio management. In the context of this invention, the term "pressure ratio" refers to the ratio of the fired air-fuel mixture pressure in an engine cylinder at a given crank angle (i.e., piston position) to the pressure of a motored (no ignition) engine when the cylinder contains the same mixture at the same volume. As will be seen, the term "pressure-ratio management" refers to the use of such ratios in a programmed engine control computer to manage certain parameters affecting engine operation. More specifically, this invention relates to the use of pressure-ratio management of an internal combustion engine to detect partial-burn and misfire situations in a cylinder.

BACKGROUND OF THE INVENTION

Development of advanced engine control systems for the modern four-stroke gasoline engine is being driven by demand for higher fuel economy and increasingly stringent exhaust emission standards. Moreover, the further development of such systems is driven by requirements in the United States, for example, for on-board diagnosis (OBD II) of engine operating events that could adversely affect the catalytic converter or other emissions control equipment.

Individual-cylinder pressure-based feedback is a suitable method to optimize engine operation because engine cylinder pressure is a fundamental combustion variable that can be used to characterize the combustion process for each combustion event. For example, it has been demonstrated that optimal engine control can be maintained by monitoring the pressure in each cylinder and using that information for feedback control of spark timing, exhaust gas recirculation (EGR), air-fuel ratio (A/F), fuel balancing between cylinders, and combustion knock.

Frederic Matekunas has demonstrated (see U.S. Pat. Nos. 4,621,603; 4,622,939 and 4,624,229) that a methodology called "pressure-ratio management" can be used in computer-based, closed-loop, engine-combustion control to better manage air-fuel ratio (including fuel balance between cylinders), ignition timing and EGR dilution, respectively. The teachings of these three patents are incorporated herein by reference. Matekunas' pressure-ratio management (PRM) involves computer-based engine controls and control algorithms which are facilitated by the availability of a production-viable, reliable cylinder-pressure sensor. The PRM methods require only a signal that has a linear relationship to the cylinder pressure without knowledge of either the gain or the offset of the cylinder pressure related signal. This provides the potential of applying sensors which need not be calibrated and which may measure pressure by means which are less direct than those sensors which must be exposed to the combustion gases in the engine cylinder. Such a sensor is a non-intrusive device called the "spark-plug boss" cylinder-pressure sensor as disclosed in U.S. Pat. No 4,969,352 to Mark Sellnau. Some features of PRM will be summarized here because they can be used in combination with the processes of this invention.

PRM uses pressure data from one or more individual engine cylinders, at specified piston positions and corresponding known cylinder volumes. The data is used in the form of the ratio of the fired cylinder pressure and the "motored pressure" (i.e., the pressure that would exist in the cylinder due to the presence of an air and fuel mixture if combustion did not occur). Pressure ratio is calculated for a piston position in terms of the current crank angle position, $\theta$, in accordance with the following equation 1.

$$PR(\theta) = P(\theta)/P_{mot}(\theta) \tag{1}$$

Plots of fired pressure and motored pressure data for a cylinder over a range of crank angle positions before and after the top dead center position of the piston are shown in FIG. 1A. FIG. 1B is a graph of pressure ratios (PR) corresponding to the pressure data of FIG. 1A. As seen in FIG. 1B, the PR has unity value before combustion and rises during combustion to a final pressure ratio (FPR) which depends on the amount of heat release per unit charge mass of combustible fuel and air mixture.

The increase in the final pressure ratio is called the modified pressure ratio, MPR.

$$MPR = FPR - 1 \tag{2}$$

The fractional rise in the pressure ratio is an estimate of the mass burn fraction in the cylinder during a single combustion event. As described in the Matekunas patents, the accuracy of the estimate is influenced only slightly by heat transfer and piston motion. Since the pressure ratio is, by definition, a ratiometric measure of cylinder pressures, PRM algorithms do not require the gain of the pressure sensor. The bias of the pressure signal (voltage) is computed using two compression samples with the assumption of polytropic behavior, which is satisfied whether or not the signal is an absolute pressure. Therefore, PRM is inherently insensitive to many of the common errors in pressure measurement. Importantly, this enables use of low-cost pressure sensors for practical implementations of the system.

Implementation of PRM (for an uncalibrated and arbitrarily biased pressure signal) requires signal sampling at a minimum of four discrete crank angle locations for which cylinder volume is known. [With an absolute pressure transducer, only a single early sample point is required. The mechanization described here is based on triggering of the pressure samples using a 24-tooth crank wheel, which provides the ability to sample at 15-degree intervals. The wheel is aligned to provide a sample at 10 degrees (ATDC).] Suitably, two samples are taken prior to significant heat release, typically 35 and 50 crank angle degrees before the top-dead-center (BTDC) position of the piston on the compression stroke, for determination of the motoring-pressure waveform (see FIG. 1A) and the pressure-sensor signal bias, both from polytropic relationships. A sample taken after combustion is complete, typically at the piston position characterized by 55 crank angle degrees after top dead center (ATDC), is needed to determine the FPR, which is represented as quantity B in FIG. 1B. A sample taken at 10 crank angle degrees ATDC (during combustion) provides the pressure ratio at this sampling point. The fractional rise in pressure ratio is an estimate of the mass-burn fraction in the cylinder in which the pressure is measured. For the 10 degree ATDC point, this is represented by the quantity A/B in FIG. 1B and is also used by Matekunas as a PRM combustion timing parameter, referred to as PRM10.

$$PRM10 = [PR(10) - 1]/[FPR - 1] \tag{3}$$

The PRM10 timing parameter (equation 3) is a very sensitive measure of combustion phasing and is useful for minimum ignition (spark) advance for best torque (MBT) spark timing control.

PRM10 values range between 0 and 1. For spark-ignited engines, MBT spark timing usually yields a PRM10 value of about 0.55 with only slight sensitivity to mixture strength and engine speed. As shown in FIG. 1B, an exemplary value of MBT timing is spark ignition at 40 degrees BTDC. Retarded spark timing yields lower values of PRM10; advanced timing yields higher values of PRM10. Typically, a change of 0.1 in PRM10 corresponds to 3 to 5 crank angle degrees change in spark timing. Because the mass burn rate and the slope of the PR curve are near their maximum at 10 degrees ATDC (e.g., see FIG. 1B), the PRM10 parameter remains a sensitive measure of combustion phasing even for high dilution ratios.

For combustion with MBT spark timing, the value of FPR is a maximum for stoichiometric mixtures with no dilution, and decreases as excess air, EGR, or residuals are increased. Therefore, FPR is useful as an indicator of total charge dilution, and is applicable to the control of mixture dilution in systems which are lean burn, use high amounts of EGR, or vary the amount of residual through variable valve train systems. For spark-ignited engines with MBT spark timing, FPR has a typical range between 2.8 and 4.0.

$$FPR=PR(55) \quad (4)$$

The FPR value varies with cycle timing, higher for retard from best timing and lower for advance. As discussed in the original PRM patents, the correlation of FPR with cycle timing as measured by PRM10 allows the calculation of the expected value at best timing based on the amount of retard or over advance from best timing. This allows for an individual cycle estimation of the mixture based on FPR (MBT) even though the timing of the cycle is not at best timing. The FPR(MBT)−1.0 calculated using this correlation is called the Dilution Parameter, or DILPAR. (Subtraction of 1.0 from the FPR value provides a parameter that directly proportions with the ratio of fuel burned to total mass of dilution.)

$$DILPAR=FPR+(0.5*PRM10)-1.275 \quad (5)$$

DILPAR provides an estimate of total charge dilution for any one cycle that burns completely. DILPAR exhibits lower cyclic variability than FPR (or MPR), which include the effects of combustion phasing. Since the total charge dilution that a combustion system can tolerate remains nearly constant over the full operating range, DILPAR is a very useful estimator for combustion control with lean A/F ratios or high EGR.

From this understanding of the Matekunas pressure ratio and its use to characterize the combustion process, a variety of engine diagnostic and control strategies have been conceived. The overall engine control strategy for this system was to deliver EGR near the dilution limit, optimize individual-cylinder spark timing, and balance A/F ratio between cylinders, adaptively, for maximum fuel economy and minimum emissions over the life of each vehicle.

While the teachings of the above-identified Matekunas patents provide the basis for substantial improvements in closed loop engine controls, there remains a need for further improvements with respect to detection of partial burns of the combustible mixture in a cylinder, the detection of misfires, and spark-retard control under various engine conditions. Reliable misfire detection is necessary for the U.S. Federal OBDII diagnostic requirements for protection of the vehicle's catalytic converter over the full range of engine operating speed and load. However, partial burn situations can also contribute to catalyst degradation, and they often arise before a misfire occurs. Furthermore, accurate and reliable partial burn detection would enable more efficient use of engine control strategies in engine cold starts, and during transmission gearshifts and periods of engine idle. For such conditions, high levels of retard can introduce very late burning or partially burning cycles intentionally which might erroneously be considered "misfire cycles" by speed variation or ion sense misfire detection schemes.

Accordingly, it is an objective of this invention to provide a process using PRM that increases its capability so that it can be used to reliably sense partial burns and misfires on a cylinder by cylinder basis. It is a further objective of this invention to provide such a process that is robust when the combustion event is severely retarded and to provide spark-timing control under these conditions.

SUMMARY OF THE INVENTION

In a first embodiment, this invention is a process that uses cylinder pressure ratio (as defined in equation 1), evaluated at a suitable crank angle during the expansion stroke in an internal combustion engine as a measure of the fraction of the fuel burned. This valuation enables calculation of the unburned fuel entering the exhaust for each cylinder and each engine cycle. Expressed as a series of equations, this embodiment of the invention is a process comprising the following calculation steps:

Fraction of Fuel Burned=[$PR$(crank angle 1)−1.0]/[$PR$(complete burn)−1.0]

Fraction of Fuel Unburned=1.0−Fraction of Fuel Burned

Unburned Fuel/Cycle/Cylinder=Fraction of Fuel Unburned*Fuel Delivered per Cycle

PR(Crank Angle 1) is the pressure ratio evaluated at the selected crank angle. An example of a suitable Crank Angle 1 is 55 crank angle degrees ATDC.

The PR (complete burn) is the value of the pressure ratio had combustion gone to completion at crank angle 1, e.g., a FPR. This value can be determined for the particular operating condition through experiment or estimated based on the relative dilution of the charge by residual combustion gasses, excess air, or EGR for the operating condition. For weak mixtures corresponding to high levels of charge dilution [by residuals (light load), excess air (lean) or EGR], the PR for complete burning corresponds to a number close to 3.0 for conventional gasoline engines. For engines capable of very lean operation (stratified charge or diesel engines), the PR for complete burning will be lower and will scale approximately by the relation:

$PR$(complete burn)−1=constant*mass fuel/(mass air+mass EGR+ mass fuel)

The PR for complete burning for operating conditions with relatively low charge dilution (high load, no EGR, stoichiometric mixtures) is somewhat over 4.0.

The cumulative amount of fuel entering the exhaust for a given period of time from all cylinders is computed by summing the unburned fuel estimates for individual cycles and individual cylinders for a period of time or number of cycles. This amount is compared to a critical value that would result in catalyst damage, as established through testing or calibration, for the particular engine system and for a range of operating conditions. (For example, during the engine test, a thermocouple could be located in the catalyst to determine if critical temperatures were reached and catalyst damage could occur).

Should the unburned fuel flow rate exceed the critical value, two actions could result. A diagnosis of the engine-operating condition is performed and appropriate "corrective action" is taken, such as advancing the spark timing, to reduce the unburned fuel rate and/or protect the catalyst. Depending on whether vehicle engine controller provides individual cylinder control, the correction is made to individual cylinders or to a group of cylinders on an averaged basis. If corrective action for the condition is unsuccessful or unacceptable, the driver is notified via a light on the dashboard. The objective of this unburned fuel calculation process is to prevent catalyst damage in as many cases as possible.

The invention may also be practiced in accordance with a related embodiment. Instead of using a selected pressure ratio to calculate the mass of unburned fuel leaving a cylinder or group of cylinders, a modified pressure ratio (equation 2) using a suitable final pressure ratio may be selected that characterizes complete combustion, a partial burn or a misfire. The final pressure ratio is calculated using a fired pressure taken at a crank angle when combustion should have occurred. Under these circumstances, a MPR close to zero indicates a misfire on the tested cycle and a value less than about two may be indicative of a partial burn. If such a low MPR is detected for a cylinder, the test is repeated for a few cycles to confirm that current engine operation parameters, or ignition failure, are causing combustion problems. As described in the above embodiment, engine control corrective action, such as spark advance, is undertaken and/or a notice is given to the vehicle operator of the possible damage to the catalytic converter.

Other objects and advantages of the invention will become apparent from a detailed description of preferred embodiments of the invention that follows below.

DESCRIPTION OF PREFERRED EMBODIMENTS

Figure 2:
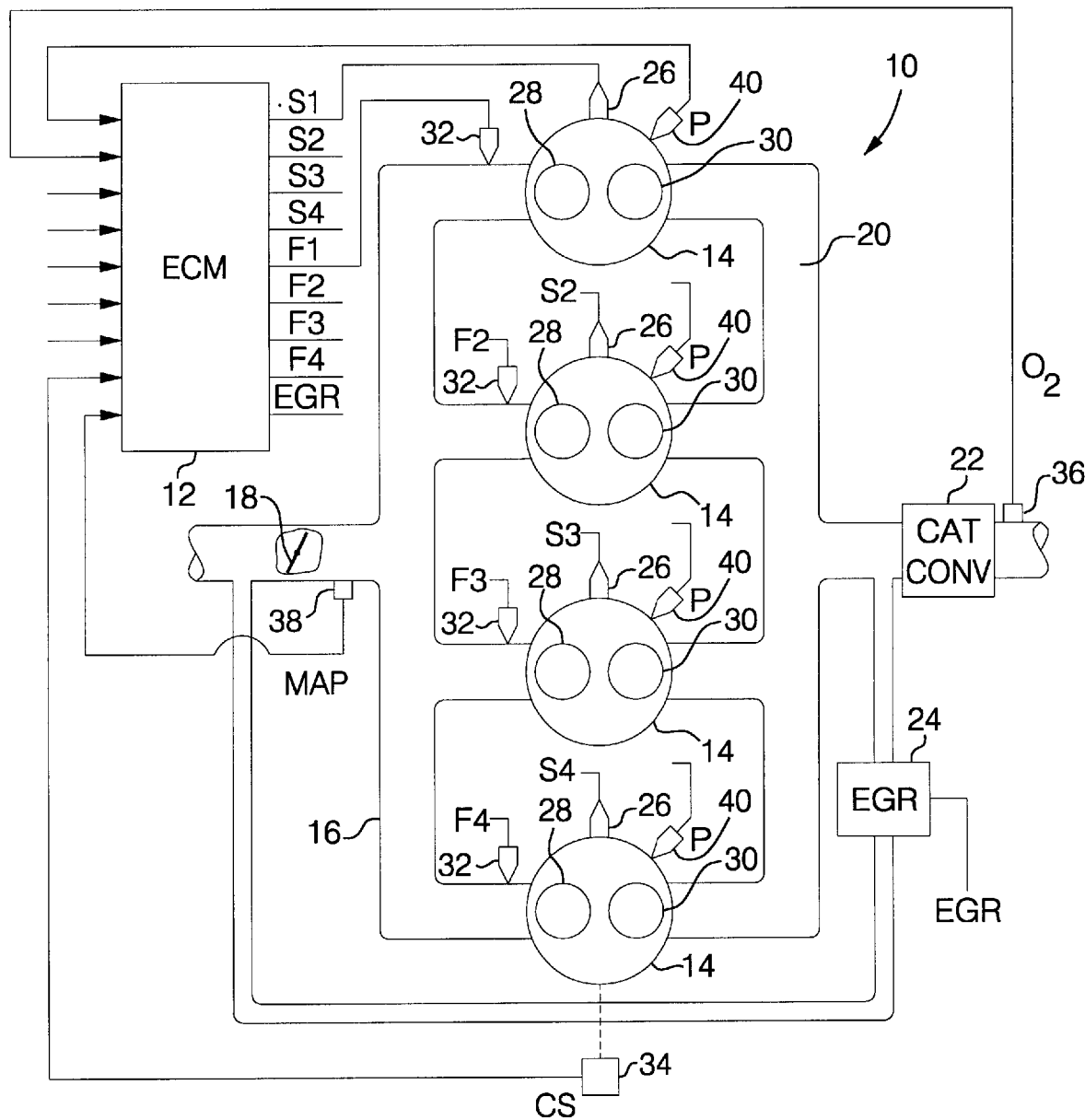
FIG. 2 is a diagram of an engine and engine control system, including a microprocessor-based controller, for the practice of this invention.

FIG. 2 depicts a motor vehicle internal combustion engine 10 and a microprocessor-based engine control module (ECM) 12. For purposes of illustration, the engine 10 is depicted as having four cylinders 14, an intake manifold 16 with throttle valve 18, and an exhaust manifold 20 with a three-way catalytic converter 22. An exhaust gas recirculation (EGR) valve 24 returns a portion of the exhaust gases from the exhaust manifold 20 to the intake manifold 16. Each cylinder 14 is provided with a spark plug 26, an intake valve 28 coupled to the intake manifold 16, and an exhaust valve 30 coupled to the exhaust manifold 20. Fuel is delivered to the intake manifold 16 at each intake valve 28 by a respective fuel injector 32. In some engines, not shown, fuel is injected directly into each cylinder of the engine.

Although not shown in FIG. 2, each cylinder 14 houses a piston which is mechanically coupled to a crankshaft which in turn provides motive power to the vehicle through a transmission and drivetrain. During rotation of the crankshaft, the piston reciprocates in the cylinder through positions usually characterized by the crankshaft angle with respect to the top-dead-center position of the piston.

The ECM 12 receives a number of input signals representing various engine and ambient parameters, and generates control signals F1–F4 for the fuel injectors 32, S1–S4 for the spark plugs 26, and EGR for the EGR valve 24, all based on the input signals. Conventionally, the inputs include crankshaft (or camshaft) position as provided by a variable reluctance sensor 34, exhaust gas air/fuel ratio as provided by oxygen sensor 36, and intake manifold absolute pressure (MAP) as provided by pressure sensor 38. Other typical inputs include the manifold absolute temperature (MAT), ambient (barometric) pressure (BARO), fuel rail pressure (FRP), and mass airflow (MAF).

ECM 12 also receives input signals indicative of cylinder pressure from one or more pressure sensors 40. If the processes of this invention are to be practiced with respect to each cylinder of the engine, as is preferred, a suitable pressure-indicating sensor 40 will be provided at each cylinder as shown in FIG. 2. As stated above, the spark plug boss type sensor for indicating cylinder pressure is very useful in the practice of this invention because it is responsive in providing timely signals without intruding into the cylinder. In this embodiment, a spark plug boss type pressure indicating sensor 40 would, of course, be located around each spark plug 26. ECM 12 uses pressure indicative signals at appropriate crank angle positions in each cylinder to calculate cylinder pressure ratios for use in the practice of the invention.

For the most part, the control algorithms for generating the fuel and spark control signals are conventional and well known. For example, fuel may be supplied based on MAF, or by a speed-density algorithm, with closed-loop correction based on the feedback of oxygen sensor 36. This practice works best with engines intended to operate at close to the stoichiometric air to fuel ratio. Spark timing may be controlled relative to crankshaft position based on engine speed and throttle position and/or by the PRM practices (with signals from sensors 40) disclosed in the Matekunas patents. PRM practices are also particularly useful in controlling a dilute-burn engine using large EGR and or a high air to fuel ratio. Under steady state and warmed-up engine conditions, the present closed-loop feedback processes allow the ECM 12 to reasonably control the engine 10 to minimize emissions while maintaining performance and driveability.

However, difficulties are encountered during cold start when the oxygen sensor is not warmed to its operating temperature and closed loop operation is not possible. At cold start it is desired to retard the spark timing so that combustion of the air-fuel charge is completed just before the exhaust valve opens. There is power loss from this late combustion but the hot exhaust gases serve to more rapidly heat the catalytic converter and oxygen sensor. Prior to this invention, there has been no suitable process to control spark retard while avoiding the exhaust of excessive unburned fuel to the converter or falsely detecting misfire caused by variability in cold fuel delivery and uncertainty in the resulting burning rates. Consequently, conservative open loop spark calibrations have been used that fail to make the best use of retarded combustion to heat the converter.

In addition to the cold start problem, there are other engine operating conditions where it would be desirable to further retard spark timing without risking false detection of misfire. These situations include torque management using spark retard during transmission gear shift and during engine idle control. In both of these situations, it would be preferable to accurately apply significant spark retard without exceeding limits on the amount of unburned fuel in the exhaust or without falsely detecting misfire. Prior to this invention, there has been no robust feedback engine control process for diagnosing the degree of retard for torque reduction and idle speed control. This has necessitated tedious open-loop calibrations with lower amounts of spark retard.

Misfire and Partial-Burn Detection Using Cylinder Pressure Sensors and Pressure-Ratio Management (PRM)

A primary objective of the subject misfire detection system is to satisfy OBD II requirements for catalyst protection over the full range of engine-operating speed and load. It is now found that a system can be implemented using cylinder pressure sensors and Pressure-Ratio Management algorithms that provides an estimate of the unburned fuel leaving each cylinder for each engine tiring. The method allows for classification of cycles based on using the modified pressure ratio (MPR) which, as stated above, is defined as $$MPR = FPR - 1$$

where FPR is the final pressure ratio and is fundamentally an indicator of the heat release per unit charge mass. The method provides an estimate of the unburned fuel amount leaving the cylinder. The overall method is summarized in the table below. Required accuracy of MPR is nominally +/−0.3.

| Calculated MPR Value | Diagnostic Result |
|---|---|
| 2 < MPR < 3.5 | Normal Complete-Burn Cycles |
| MPR ~ 0 | Total Misfire Cycles |
| 0 < MPR < 2 | Late or Partial-Burn Cycles |

Figure 3:
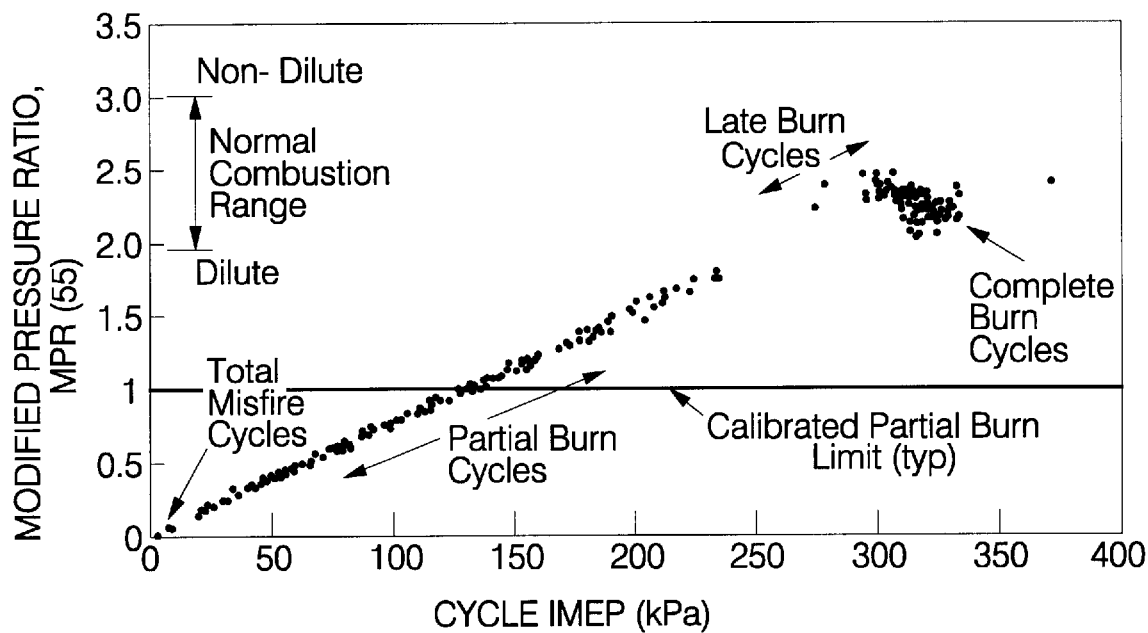
FIG. 3 is a graph of modified pressure ratio data at 55 Deg ATDC, MPR(55), vs. cycle indicated mean effective pressure (IMEP) in kiloPascals for a 2.4 L engine operated at stoichiometric air-to-fuel ratio and at a very lean fuel ratio.

An example of the use and validity of the algorithm was illustrated by an engine test using a 2.4 Liter, L4, four-valve, double overhead camshaft, spark-ignited, gasoline engine. A Kistler pressure transducer was used in the cylinder for measuring indicated mean effective pressure (IMEP) as well as the PRM parameters for each combustion cycle. During the test, the engine was operated under part throttle at 2000 rpm with a fixed spark timing of 10 degrees BTDC. The engine was first operated for about 50 cycles at stoichiometric A/F ratio (14.7/1). Then, by reducing the fuel flow, the engine was operated for about 100 cycles at a very lean A/F of 23/1. Finally, the A/F was restored to the stoichiometric level and pressure data acquired for an additional 50 cycles. The data is summarized in FIG. 3 as a plot of the 200 MPR(55) values against the corresponding IMEP values in kPa. Based on pressure-ratio managed operating experience with the test engine, normal combustion values of MPR(55) for lean to stoichiometric A/F fall in the range of about 2 to 3 (or higher) and this experience is indicated in FIG. 3. MPR(55) values below 2 indicate a late-burn cycle or a partial-burn cycle and values near zero indicate a total misfire.

Referring to FIG. 3, it is seen that stoichiometric air-to-fuel ratio operation produced a cluster of normal, complete burn combustion cycles as indicated by suitable IMEP and MPR(55) values. In contrast, the lean A/F burns more slowly, exhibits high cyclic variability, and is also sufficiently lean to yield a fraction of cycles exhibiting complete misfire. Despite operation at constant fuel ratio and spark timing, the combustion results vary greatly over the 100 cycles as indicated by the MPR(55) and IMEP data. It is observed that MPR value provides a direct correlation to the cycle IMEP. Using MPR as a measure of the extent of combustion at the 55-degree sample point, the data indicate that any burning that occurs after this timing has little contribution to the cycle work output.

For normal combustion conditions in gasoline engines, heat release is typically complete before the 55 CAD ATDC sample point used for pressure-ratio calculations. For abnormal combustion cycles with very late burn characteristics, the potential exists for cycles that have not necessarily completed burning by 55 CAD ATDC. To access the amount of burning that occurs beyond 55 CAD ATDC, both MPR at 55 ATDC and MPR at 120 ATDC were calculated from the measured pressures. The 120 CAD ATDC sample point corresponds to a crank position just before the exhaust valve opens.

Figure 4:
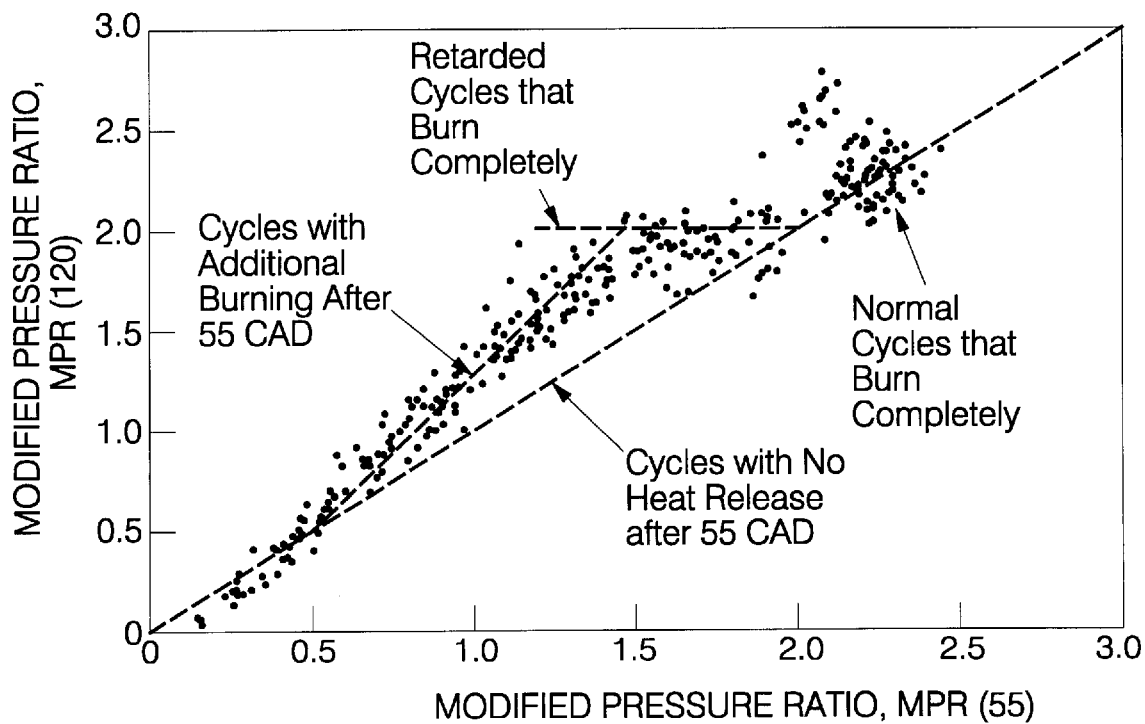
FIG. 4 is a graph of MPR(120) data vs. the MPR(55) data of FIG. 3.

FIG. 4 shows a plot of MPR(120) vs. MPR(55). The inclined dashed line corresponds to equal pressure ratios for both sample points. For cycles on this line, the pressure ratios are equal and there is no burning after 55 CAD ATDC. For cycles along or near the upper horizontal line, combustion is considered to be complete at exhaust valve opening [1.8<MPR(55)<2.0]. For cycles with MPR(55) between 0.5 and 1.8, combustion was incomplete and most cycles had some degree of burning after the 55 degree sample point since MPR(120) is greater than MPR(55). For cycles with MPR(55) below about 0.5, no more than 25% of the charge has burned and combustion is quenched. It can be concluded that the MPR(55) value particularly in the region below 0.5 represents a reasonable and conservative estimator of the fraction of burned fuel leaving the cylinder for the purpose of estimating catalyst heating rate.

Tests like those described above were performed using the spark-plug-boss pressure sensor described in the Sellnau patent over a wide range of engine speeds at "zero brake torque" (neutral gear). The mixture was very dilute creating a distribution of total misfire, partial-burn or late-burn, and complete-burn cycles. One hundred cycles were sampled at speeds of 1250, 2000, 3000 and 4000 rpm, respectively. A Kistler pressure transducer mounted in each cylinder was used as a reference. The data showed that partial-burn cycles and total-misfire cycles were easily detected by the process.

Figure 1A:
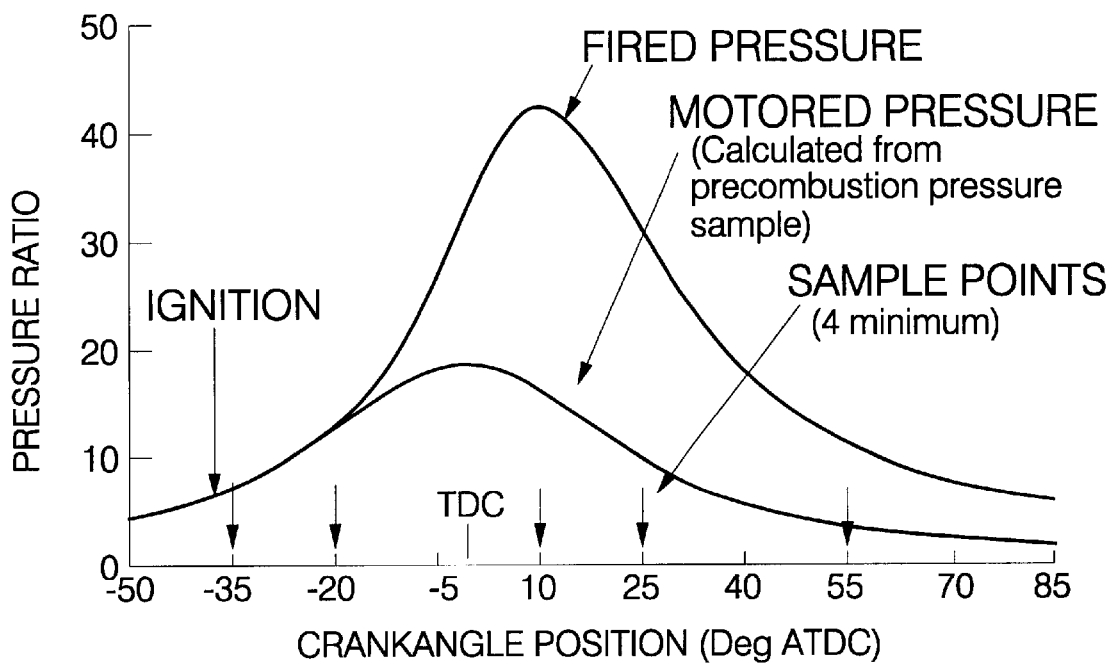
FIG. 1A is a graph of motored cylinder pressure and fired cylinder pressure over a range of crank angle positions from −50 degrees after the piston top-dead-center position (Deg ATDC) to 85 Deg ATDC.
Figure 1B:
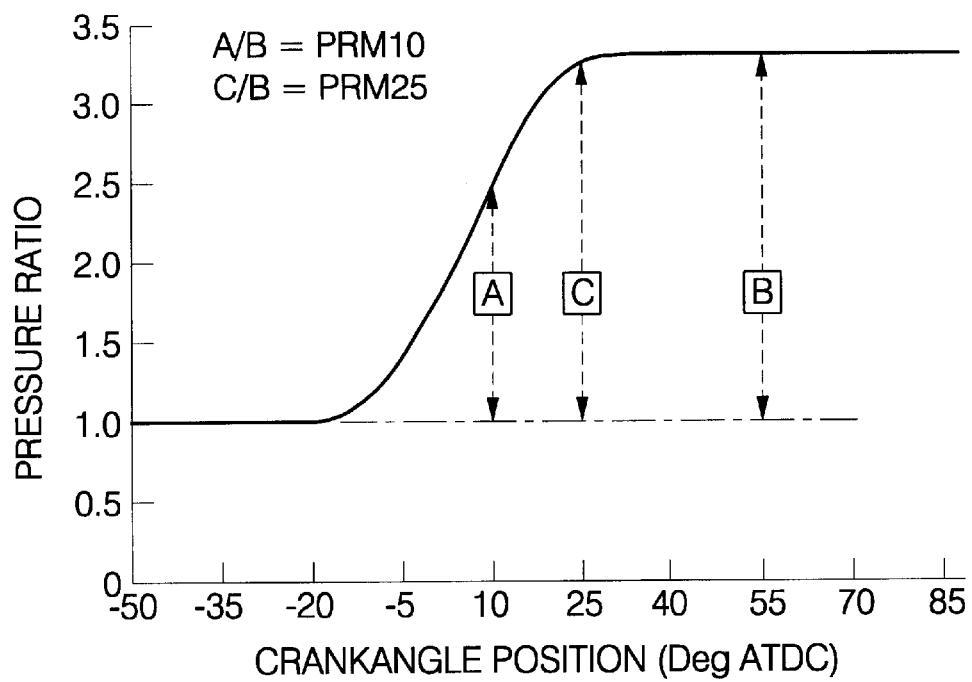
FIG. 1B is a graph of the pressure ratios of the motored and fired cylinder pressures portrayed in FIG. 1A over the same range of crank angle positions.

Late-Burn Detection for Spark Retard Control during the Cold Start for Catalyst Heating and during Transmission Shifts for Torque Reduction As described in the Background section above, for conventional gasoline engines, the spark timing that produces the best thermal efficiency corresponds to a 50% mass burn fraction (MBF) at about 10 degrees after top dead center (CA50~10 ATDC). This spark timing is called "minimum spark advance for best torque" (MBT). To achieve MBT spark timing using feedback control, an algorithm has been developed that is based on the cylinder pressure ratio. According to PRM fundamentals, the fractional pressure ratio is a good approximation of the mass burn fraction. For this reason, the fractional pressure ratio at 10 ATDC (PRM10) with a nominal target of 0.5 has proven to be a robust timing parameter for MBT spark control (see equation 3 above). It is called the PRM10 Timing Parameter. Cylinder pressure, the pressure ratio, and PRM10 are shown in FIGS. 1A and 1B for one combustion cycle.

Closed-Loop Spark Retard Control Using PRM25

Retarded spark timing control is useful to reduce NOx emissions (with some fuel economy penalty) and for detonation suppression. Retarded spark timing control can be achieved by controlling the PRM10 timing parameter to targets below 0.5.

For operating conditions where it is desirable to retard spark timing later than can be sensed accurately using PRM10 (i.e., using the 10 degree ATDC point), a later pressure sample point may be defined to calculate an "additional timing parameter". These operating conditions include cold operation where heavy spark retard can be used to increase exhaust temperature for fast catalyst heating, transmission shift control with momentary spark retard to reduce engine torque (engine torque management), and idle speed control. The benefit during the cold start and warm-up is optimum catalyst heating without exceeding the driveability limit. For transmission shift control, engine torque may be controlled during the shift for improved shift quality.

In engine control systems with pressure sampling triggered by a 24×crank timing wheel, pressure signals are available only at 15 crank angle degree intervals. Accordingly, if it is determined that PR data at 10 degrees ADTC is not suitable, 25 degrees ATDC is the next available sample point (later sample timings are also potentially useful). The PRM25 timing parameter is defined using this sample point and is illustrated in FIG. 1B. An additional "later final sample point" (i.e., at 70 or 85 or even 100 degrees ATDC) may be desirable for meaningful calculations of PRM25 under high spark retard conditions. The final sample point is typically positioned on the expansion stroke after combustion has ceased.

Closed-Loop Spark Retard Control Using MPR

Another method to provide spark retard control is to close the loop on the pressure ratio itself (MPR). This may be useful for system architectures that don't conveniently support a final sample point after combustion has ceased. As discussed earlier in this specification for partial burn detection, MPR(55) directly correlates with the reduction in cycle work (IMEP).

Spark retard control can be implemented by adjusting the spark timing to produce a targeted value of MPR(55). Actual control targets may be determined by calibration for operating conditions where such retard is useful. The parallel computation of unburned fuel rate to the exhaust based on the MPR value provides appropriate retard without exceeding limits for hydrocarbon emissions or excessive catalyst heating, two potential limits on the level of extreme retard. A third criterion can be engine torque stability which will tend to increase with lower targets for MPR(55) and will influence driveability.

Engine and Vehicle Development Tool

Both of the parameters described above, PRM25 (or similar, PRMxx) and MPR(55) (or similar, MPR(xx)), may be used to enhance and improve the engine development and vehicle calibration processes. The parameters may be integrated into a combustion analysis and diagnostic engineering tool based on Pressure-Ratio-Management.

System Implementation

In practice, spark retard control would probably be implemented using both PRM Timing Parameter (such as PRM25) and MPR detection. In general, this will provide the most information by which to achieve accurate feedback control.

For implementation of spark timing control, combustion variability must be considered in the design and calibration of the feedback system. During transmission shifts, a sufficient number of cycles may not be available for direct feedback control. Under these circumstances, the MPR values can be observed for the shift, averaged with observations for other shifts in a similar operating range, and used to modify the spark timing for future shifts.

This invention has been described in terms of some specific embodiments. It is apparent that other forms of the invention could readily be adapted by those skilled in the art.

What is claimed is:

1. A method of estimating the unburned fuel rate to the exhaust from at least one cylinder of a multi-cylinder engine in an automotive vehicle, said engine comprising a plurality of cylinders, each cylinder containing a reciprocatable piston and having a known volume at each position of said piston, said pistons being connected to a crank shaft for rotation through a top dead center position in their respective cylinders; said engine further comprising means for introducing air and fuel into said cylinders to form a combustible mixture, means for ignition of said combustible mixtures, means for exhausting combustion gases from said cylinders, a crank shaft position sensor to determine the position of said pistons with respect to their top dead center positions, a sensor for providing signals indicative of the pressure in said cylinder at predetermined crankshaft positions; said vehicle comprising a programmed computer for controlling fuel delivery and optional exhaust gas recycle flow to said cylinders and ignition timing therein, and for detecting and recording possible engine operating conditions adverse to an exhaust gas treatment system of said vehicle, said computer being adapted to receive pressure indicative signals and crank shaft position signals from said sensors, said method being performed by said computer immediately following predetermined combustion events with respect to each cylinder in which said condition is to be detected and comprising, computing values indicative of motored pressure for a plurality of crankshaft angles based on values of the pressure indicative signals at crank angles before the top dead center position of the compression stroke of a said piston, determining a pressure indicative value for said cylinder at a predetermined crank angle after top dead center of the expansion stroke of said piston, calculating a pressure ratio of said pressure indicative value at said predetermined crank angle to the computed value of motored pressure at the same crank angle and subtracting a value of one from said pressure ratio to determine a modified pressure ratio at said crank angle, calculating the quotient of said modified pressure ratio and a predetermined reference value for complete burning at the current operating condition, using said quotient subtracted from one as a measure of the fraction of fuel unburned during said combustion event, and multiplying said value by the fuel delivered to the cylinder to estimate the amount of unburned fuel leaving the cylinder and storing said value in the engine control computer.

2. A method as recited in claim 1 comprising using said stored values of unburned fuel from all cylinders and for a predetermined number of firings to determine the unburned fuel amount or rate to the exhaust for all cylinders.

3. A method as recited either claim 1 or claim 2 comprising comparing said unburned fuel amount to calibration established limits based on said operating mode for the purpose of deciding whether to take corrective engine control action to protect said exhaust gas treatment system.

4. A method as recited in claim 3 comprising changing at least one of said fuel delivery, exhaust gas recycle and ignition timing to reduce said unburned fuel amount or rate.

5. A method of detecting the relative completeness of combustion or for classifying a misfire condition in at least one cylinder of a multi-cylinder internal combustion engine in an automotive vehicle, said engine comprising a plurality of cylinders, each cylinder containing a reciprocatable piston and having a known volume at each position of said piston, said pistons being connected to a crank shaft for rotation through a top dead center position in their respective cylinders; said engine further comprising means for introducing air and fuel into said cylinders to form a combustible mixture, means for ignition of said combustible mixtures, means for exhausting combustion gases from said cylinders, a crank shaft position sensor to determine the position of said pistons with respect to their top dead center positions, a sensor for providing signals indicative of the pressure in said cylinder at predetermined crankshaft positions; said vehicle comprising a programmed computer for controlling fuel delivery and optional exhaust gas recycle flow to said cylinders and ignition timing therein, and for detecting and recording possible engine operating conditions adverse to an exhaust gas treatment system of said vehicle, said computer being adapted to receive pressure indicative and crank shaft position signals from said sensors, said method being performed by said computer immediately following predetermined combustion events with respect to each cylinder in which said condition is to be detected and comprising, computing values indicative of motored pressure for a plurality of crankshaft angles based on values of the pressure indicative signals at crank angles before the top dead center position of the compression stroke of a said piston, determining a value indicative of the actual pressure in said cylinder at a predetermined crank angle after top dead center and after combustion in said cylinder is expected to have occurred in the current operating mode of said engine, calculating a pressure ratio of said value indicative of actual pressure at said predetermined crank angle to the value indicative of motored pressure at the same crank angle and subtracting a value of one from said pressure ratio to determine a modified pressure ratio at said crank angle, and storing said modified pressure ratio in said computer as indicating a measure of the completeness of combustion or a misfire condition in said cylinder if said modified pressure ratio is a predetermined value in the range of zero to about two.

6. A method as recited in claim 5 comprising determining said modified pressure ratio for each cylinder of said engine.

7. A method as recited in either claim 5 or claim 6 comprising, upon detection of a said possible partial burn or misfire condition, repeating said pressure determination and modified pressure ratio calculation for said cylinder for a predetermined number of ignition events in said cylinder to confirm or discard notice of said possible partial burn or misfire condition.

8. A method as recited in claim 7 comprising storing a misfire condition notice in said computer if said confirmed value of said modified pressure ratio calculations is within a predetermined value of zero.

9. A method as recited in claim 7 comprising changing at least one of said fuel delivery, exhaust gas recycle and ignition timing to increase the value of said modified pressure ratio to a higher value.

10. A method as recited in claim 7 comprising changing at least one of said fuel delivery, exhaust gas recycle and ignition timing to increase the value of said modified pressure ratio to a value of at least two.

11. A method as recited in claim 7 in which said modified pressure ratio is calculated at a crank angle of 25 crank angle degrees after top dead center, or later.

12. A method of controlling the operation of a multi-cylinder internal combustion engine in an automotive vehicle where the ignition timing of said engine is to be significantly retarded from best efficiency timing, said engine comprising a plurality of cylinders, each cylinder containing a reciprocatable piston and having a known volume at each position of said piston, said pistons being connected to a crank shaft for rotation through a top dead center position in their respective cylinders; said engine further comprising means for introducing air and fuel into said cylinders to form a combustible mixture, means for ignition of said combustible mixtures, means for exhausting combustion gases from said cylinders, a crank shaft position sensor to determine the position of said pistons with respect to their top dead center positions, sensors for providing signals indicative of the pressure in said cylinders at predetermined crankshaft positions; said vehicle comprising a programmed computer for controlling fuel delivery and optional exhaust gas recycle flow to said cylinders and ignition timing therein, said computer being adapted to receive pressure indicative signals and crank shaft position signals from said sensors, said method being performed by said computer during predetermined ignition events with respect to each cylinder in which said condition is to be detected and comprising, computing values indicative of motored pressure for a plurality of crankshaft angles based on values of the pressure indicative signals at crank angles before the top dead center position of the compression stroke of a said piston, determining a value indicative of the actual pressure in each of said cylinders at a predetermined crank angle of twenty five degrees or more after top dead center, calculating a pressure ratio value indicative of the ratio of actual pressure at said predetermined crank angle to the value indicative of motored pressure at the same crank angle, and adjusting the ignition timing in each cylinder to maintain a predetermined pressure ratio value for said cylinder.

13. A method as recited in claim 12 comprising adjusting the ignition timing in each cylinder to yield the said predetermined pressure ratio value for optimum heating of the exhaust gas treatment system during cold start and warm-up modes of engine operation.

14. A method as recited in claim 12 comprising adjusting the ignition timing in each cylinder to yield the said predetermined pressure ratio value for accurate reduction in engine torque during transmission shift mode of engine operation.

15. A method as recited in claim 12 comprising adjusting the ignition timing in each cylinder to yield the said predetermined pressure ratio value during periods of idle mode engine operation.

16. A method of controlling the operation of a multi-cylinder internal combustion engine in an automotive vehicle where the ignition timing of said engine is to be significantly retarded from best efficiency timing said engine comprising a plurality of cylinders, each cylinder containing a reciprocatable piston and having a known volume at each position of said piston, said pistons being connected to a crank shaft for rotation through a top dead center position in their respective cylinders; said engine further comprising means for introducing air and fuel into said cylinders to form a combustible mixture, means for ignition of said combustible mixtures, means for exhausting combustion gases from said cylinders, a crank shaft position sensor to determine the position of said pistons with respect to their top dead center positions, sensors for providing signals indicative of the pressure in said cylinders at predetermined crankshaft positions; said vehicle comprising a programmed computer for controlling fuel delivery and optional exhaust gas recycle flow to said cylinders and ignition timing therein, said computer being adapted to receive pressure indicative signals and crank shaft position signals from said sensors, said method being performed by said computer during predetermined ignition events with respect to each cylinder in which said condition is to be detected and comprising, computing values indicative of motored pressure for a plurality of crankshaft angles based on values of the pressure indicative signals at crank angles before the top dead center position of the compression stroke of a said piston, determining a value indicative of the actual pressure in each of said cylinders at a predetermined crank angle of twenty five degrees or more after top dead center and at a later predetermined crank angle for which combustion should be complete (complete burn), calculating a pressure ratio values indicative of the ratio of actual pressure at said predetermined crank angles to the values indicative of motored pressures at the same crank angles and subtracting a value of one from each said pressure ratio to determine a modified pressure ratio for each, calculating the quotient of said modified pressure ratios corresponding to the twenty five degree or later crank angle to the said modified pressure ratio (complete burn), and adjusting the spark timing in each said cylinder to yield a value of said quotient equal to a predetermined optimum value for the engine operating condition.

17. A method as recited in claim 16 comprising adjusting the ignition timing in each cylinder to yield the said predetermined quotient value for optimum heating of the exhaust gas treatment system during engine cold start and warm-up modes.

18. A method as recited in claim 16 comprising adjusting the ignition timing in each cylinder to yield the said predetermined quotient value for accurate reduction in engine torque during transmission shift mode of engine operation.

19. A method as recited in claim 16 comprising adjusting the ignition timing in each cylinder to yield the said predetermined quotient value during periods of idle mode engine operation.

\* \* \* \* \*